June 21, 1927.
C. B. EPPERSON
1,633,440
MEANS FOR PREVENTING CHATTERING IN TRANSMISSIONS
Original Filed Nov. 24, 1924
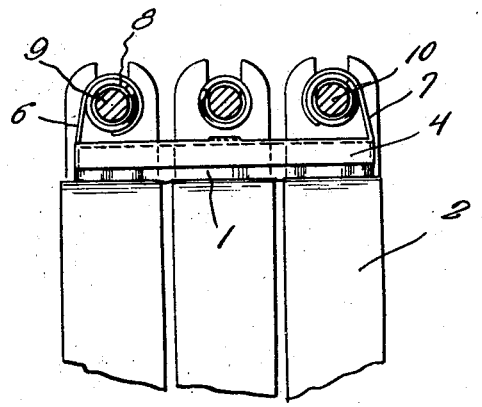
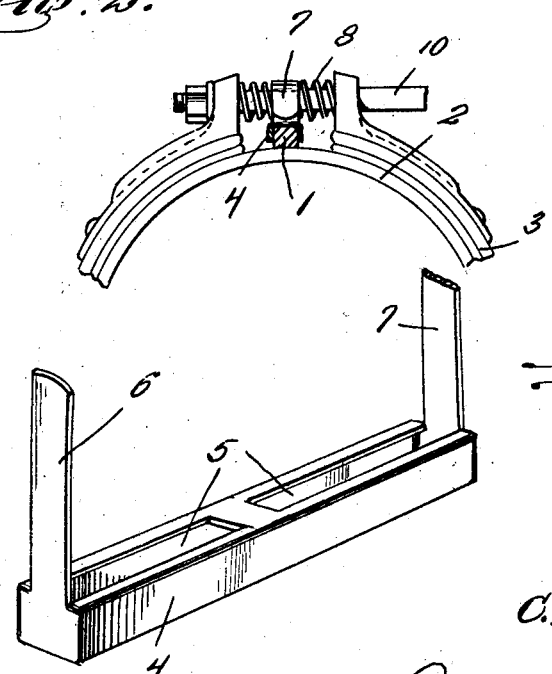
Inventor
C. B. Epperson,
By Clarence A. O'Brien
Attorney Patented June 21, 1927.

1,633,440

UNITED STATES PATENT OFFICE.

CHARLES BENJAMIN EPPERSON, OF PETERSBURG, VIRGINIA, ASSIGNOR OF ONE-THIRD TO J. H. TUCKER, OF PETERSBURG, VIRGINIA, AND ONE-THIRD TO J. L. RAWLINGS, OF SUTHERLAND, VIRGINIA.

MEANS FOR PREVENTING CHATTERING IN TRANSMISSIONS.

Application filed November 24, 1924, Serial No. 751,925. Renewed April 1, 1927.

This invention relates to a highly novel means for eliminating the chattering and the usual grabbing of the bands with respect to the drums of a Ford transmission, thus preventing the burning of the bands and saving considerable expense.

Another important object of the invention is to provide a device of the above mentioned character, which may be readily and easily attached in position, on the transmission mechanism of a Ford automobile, without necessitating the removable of the transmission bands.

A still further object of the invention is to provide a device of the above mentioned character, wherein a coating of an adhesive substance is applied to the drums of a transmission mechanism automatically during the operation of the transmission mechanism, the composition being in the form of a bar, and held in frictional engagement with the drum.

A still further object of the invention is to provide a holder for the composition, which is simple in construction, inexpensive, strong and durable, and further well adapted for the purposes for which it is designated.

Other objects and advantages of this invention will become apparent from the following description.

In the accompanying drawing, forming a part of this specification, and in which like numerals designate like parts throughout the same:

Figure 1 is a side elevation of the device embodying my invention, showing the same applied.

Figure 2 is a sectional view therethrough, and

Figure 3 is a detail perspective view of the holder for the composition.

In the drawing, wherein for the purpose of illustration is shown the preferred embodiment of my invention, the numeral 1 designates generally an elongated bar of the adhesive substance forming the composition to be applied to the drum 2 of the transmission mechanism of a Ford automobile, the transmission band cooperating with the drums being illustrated generally at 3. The bar 1 is adapted to be supported within a suitable holder 4, which is formed of metal, the top of the holder being cut away as illustrated at 5, to provide a pair of supporting arms 6 and 7 respectively, the same being struck up from the top of the holder. The bar 1 is fixedly held within the folder 4, so that the lower portion of the bar will extend below the bottom of the holder, in the manner as clearly illustrated in Figures 1 and 2. The bar 1 is disposed transversely across the drum 2 at a point between the lugs provided on the free ends of the transmission band 3, so that the bottom of the bar will frictionally engage the drum. The bar 1 is held in frictional engagement with the drum, by having the free ends of the arms 6 and 7 of the holder 4 disposed around the release spring 8, which encircles the reverse shaft and brake pedal shaft 10 and 9 respectively, in the manner as clearly illustrated in Figure 1. The arms 6 and 7 are of such length as to have the free ends thereof encircling the major portion of the respective shafts, so as to prevent the accidental displacement of the arms therefrom, thereby holding the holder 4 and the bar 1 in proper position between the lugs of the transmission band, and rendering the operation of the device positive at all times. The device is adapted to be inserted in position on the transmission mechanism, by removing the usual transmission cover door, and thus the necessity of having to remove the transmission band is eliminated.

It is obvious that when the transmission mechanism is in operation, the rotation of the drum 2 will cause the composition of which the bar 1 is formed to adhere to the surfaces of the drum, and the drum will be coated uniformly. When the device of this character is employed, the usual chattering and grabbing incident to the transmission mechanism for Ford automobiles, and furthermore the burning of the bands will also be prevented. The simplicity with which my device is constructed enables the parts to be readily assembled and inserted in position for use, and when in proper position, the application of a coating of the abrasive material to the drum will be entirely automatic.

While I have shown the preferred embodiment of my invention, it is to be understood that various changes in the size, shape, and arrangement of parts may be resorted to, without departing from the spirit of the invention and the scope of the appended claims.

Having thus described my invention, what I claim is:

1. In a means for applying a composition to the drums of a transmission mechanism, including a holder for the composition, and means for supporting said holder whereby said composition is held in frictional engagement with the drum.

2. In a means for applying a composition to the drums of a transmission mechanism including a holder for the composition, and means for supporting the holder by the shaft of the band of the transmission mechanism, whereby the composition is held in frictional engagement with the drum.

3. In a means for applying a composition to the drums of a transmission mechanism, the composition being in the form of a bar, and means for supporting the bar in frictional engagement with the drum.

4. In a means for applying a composition to the drums of a transmission mechanism including a holder for the composition, means for supporting the holder by the shaft of the band of the transmission mechanism, whereby the composition is held in frictional engagement with the drum, said last mentioned means comprising a pair of arms struck up from the holder, and having the free ends thereof engaging the shafts of the transmission bands of the transmission mechanism.

In testimony whereof I affix my signature.

CHARLES BENJAMIN EPPERSON.